(12) United States Patent
Tang et al.

(10) Patent No.: US 8,570,735 B2
(45) Date of Patent: Oct. 29, 2013

(54) ELECTRONIC DEVICE

(75) Inventors: Xue-Dong Tang, Shenzhen (CN);
Ke-Hui Peng, Shenzhen (CN);
Ren-Wen Wang, Shenzhen (CN); Ping Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 377 days.

(21) Appl. No.: 13/081,539

(22) Filed: Apr. 7, 2011

(65) Prior Publication Data
US 2012/0182686 A1  Jul. 19, 2012

(30) Foreign Application Priority Data

Jan. 18, 2011 (CN) .......................... 2011 1 0020647

(51) Int. Cl.
*H05K 7/20* (2006.01)
*G06F 1/20* (2006.01)
*G11B 33/14* (2006.01)

(52) U.S. Cl.
CPC ....................................... *G06F 1/20* (2013.01)
USPC ...... 361/679.54; 361/709; 361/719; 361/800; 720/649

(58) Field of Classification Search
USPC ............ 361/679.54, 704, 709–711, 718–719, 361/720, 722, 818, 800, 816; 165/80.2, 165/185; 174/547, 548; 257/712–713, 719; 720/649
See application file for complete search history.

(56) References Cited

U.S. PATENT DOCUMENTS

| 5,237,486 | A  | * | 8/1993 | LaPointe et al. | ......... 361/679.27 |
| 5,715,139 | A  | * | 2/1998 | Nakajima | ................ 361/679.55 |
| 6,025,991 | A  | * | 2/2000 | Saito | .............................. 361/704 |
| 6,594,147 | B2 | * | 7/2003 | Heirich et al. | ........... 361/679.47 |
| 7,755,896 | B2 | * | 7/2010 | Tamaki et al. | ................ 361/704 |
| 8,438,583 | B2 | * | 5/2013 | Li et al. | .......................... 720/649 |
| 2008/0055861 | A1 | * | 3/2008 | Nagareda et al. | ............. 361/707 |
| 2012/0224329 | A1 | * | 9/2012 | Li et al. | ......................... 361/720 |

* cited by examiner

*Primary Examiner* — Zachary M Pape
(74) *Attorney, Agent, or Firm* — Altis & Wispro Law Group, Inc.

(57) ABSTRACT

An electronic device includes a motherboard and a heat dissipating plate. The motherboard includes a base. The base includes a number of ports and an electronic element. The heat dissipating plate includes a substrate and a number of fasteners extending out from the substrate for engaging with the number of ports of the motherboard. The substrate defines a bulging cavity for engaging with and dissipating heat from the electronic element.

15 Claims, 5 Drawing Sheets

ELECTRONIC DEVICE

BACKGROUND

1. Technical Field

The present disclosure relates to electronic devices and, more particularly, to an electronic device for protecting and dissipating heat from a motherboard accommodated therein.

2. Description of Related Art

An electronic device, such as a DVD (digital video disc) player, generally includes a motherboard and a plurality of ports provided on the motherboard for connecting peripheral electronic devices, such as an earphone, a Universal Serial Bus (USB) connector, a power supply, and a controller. However, the ports may wear and become loose after frequent plugging and unplugging of the peripheral electronic devices, and the peripheral electronic devices may not be firmly fixed to the electronic device. Additionally, when the DVD player is in operation, the temperature of the DVD player increases. If the temperature of the DVD player stays high for a long time, the life time of the DVD player is dramatically shortened.

Therefore, there is room for improvement in the art.

DETAILED DESCRIPTION

Figure 1:
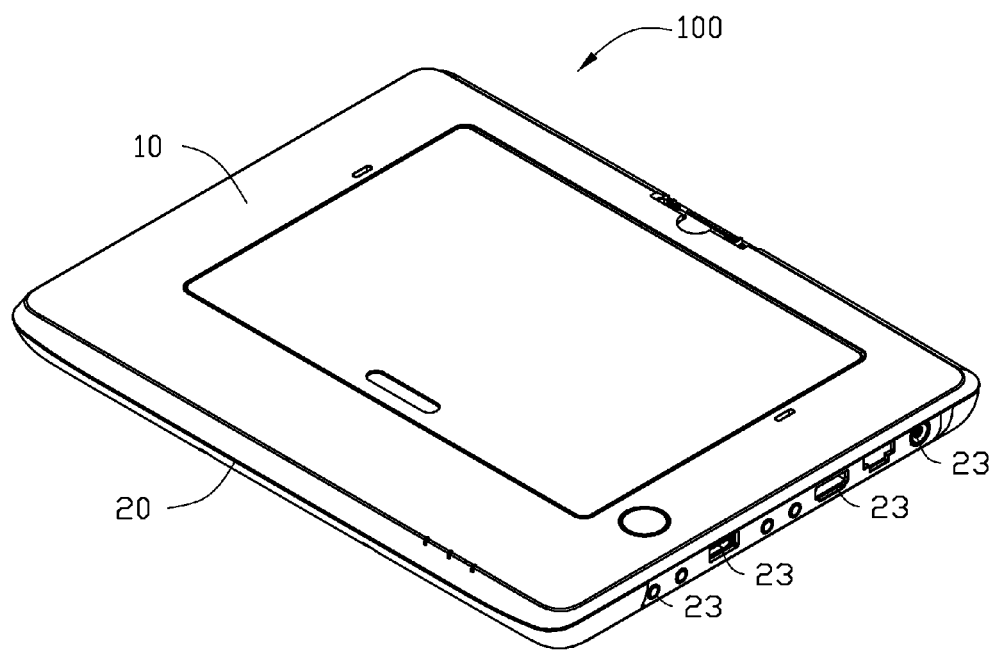
FIG. 1 is an assembled, isometric view of an electronic device in accordance with an exemplary embodiment of the present disclosure.
Figure 2:
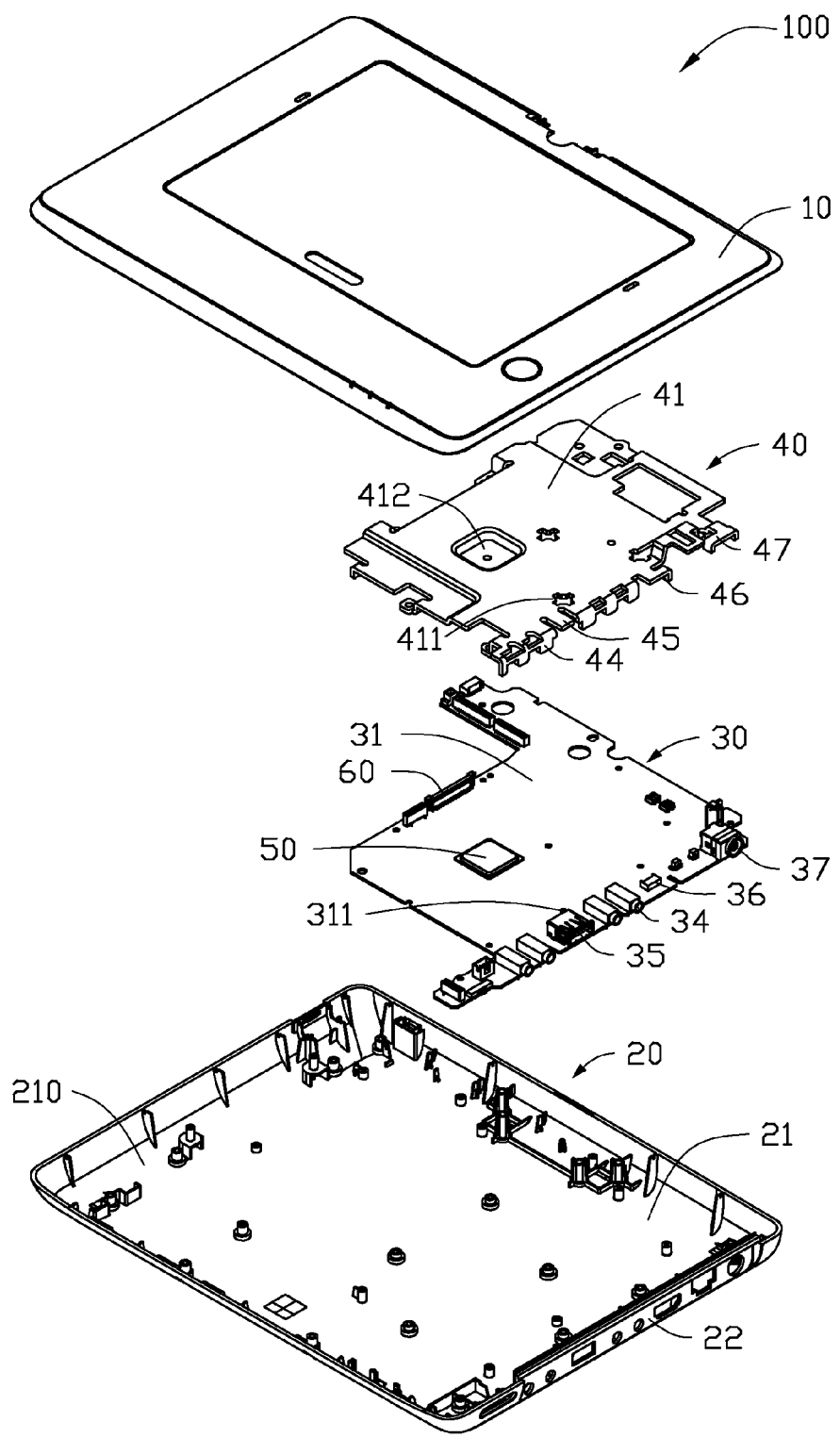
FIG. 2 is a exploded view of the electronic device of FIG. 1.

Referring to FIGS. 1 and 2, an exemplary embodiment of an electronic device 100 is shown. In the present embodiment, the electronic device 100 is a DVD player. The electronic device 100 includes an upper cover 10, a bottom cover 20 engaged with the upper cover 10, a motherboard 30 and a heat dissipating plate 40 engaged with the motherboard 30. The bottom cover 20 and the upper cover 10 cooperatively define a chamber 210. The motherboard 30 and the heat dissipating plate 40 are received in the chamber.

The bottom cover 20 includes a bottom wall 21 and a sidewall 22 extending up from a peripheral edge of the bottom wall 21. The sidewall 22 defines a plurality of receiving holes 23 communicating the chamber with the outside.

Figure 3:
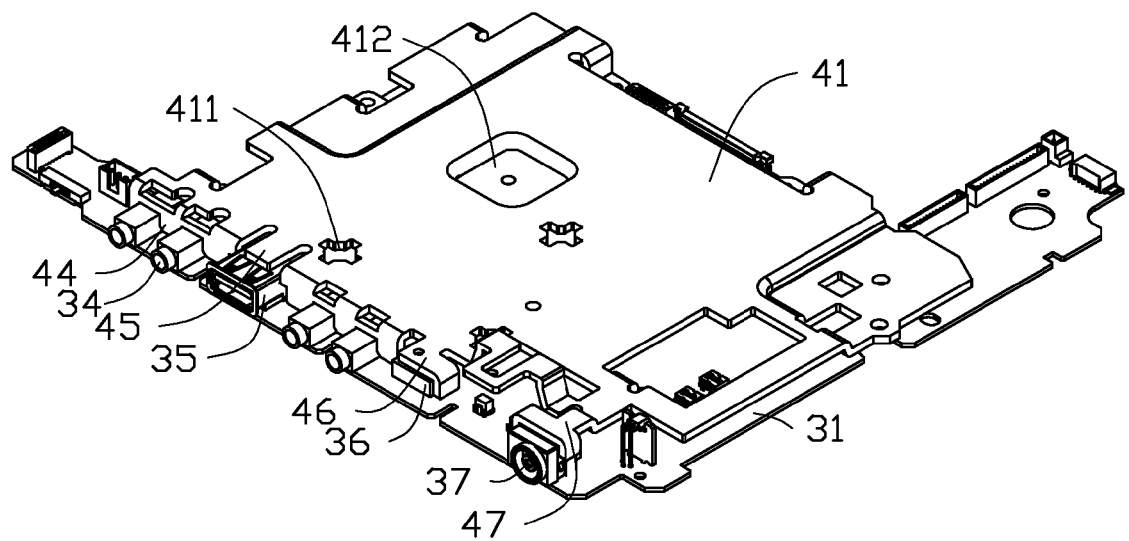
FIG. 3 is an assembled view of a main body and a heat dissipating plate of the electronic device of FIG. 2, viewed from another aspect.
Figure 4:
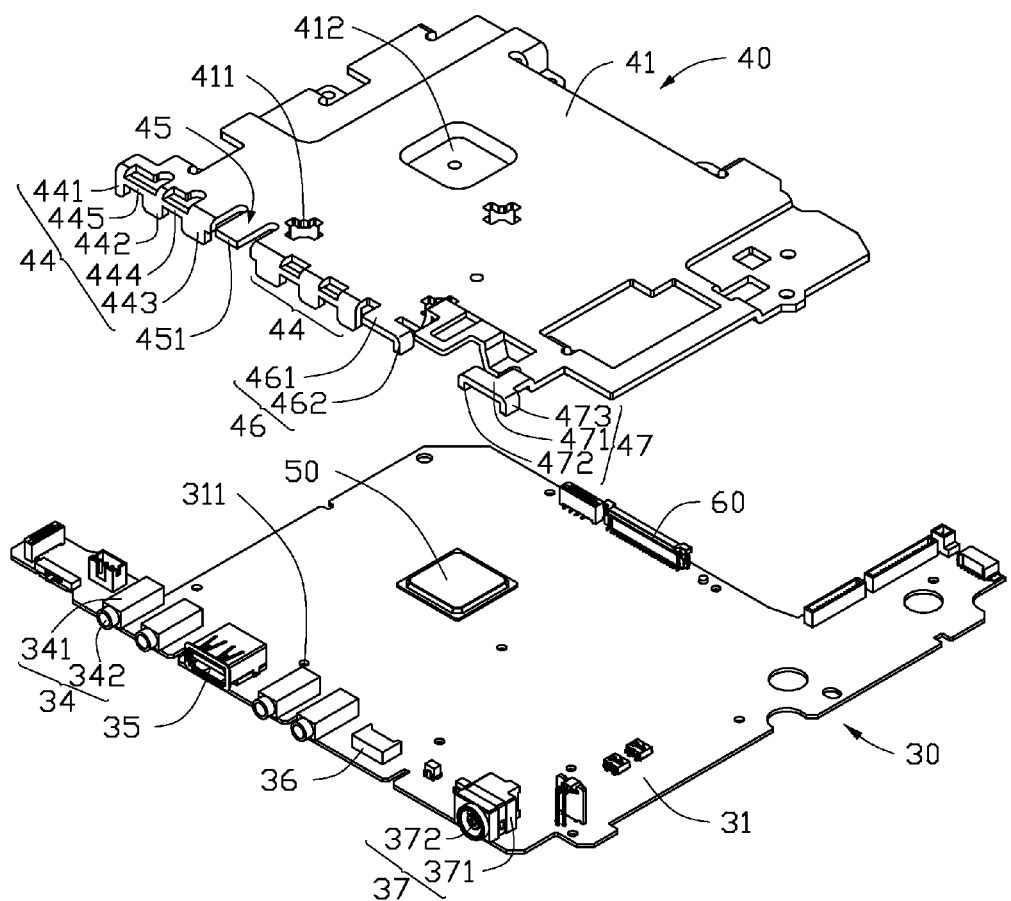
FIG. 4 is a exploded view of FIG. 3.
Figure 5:
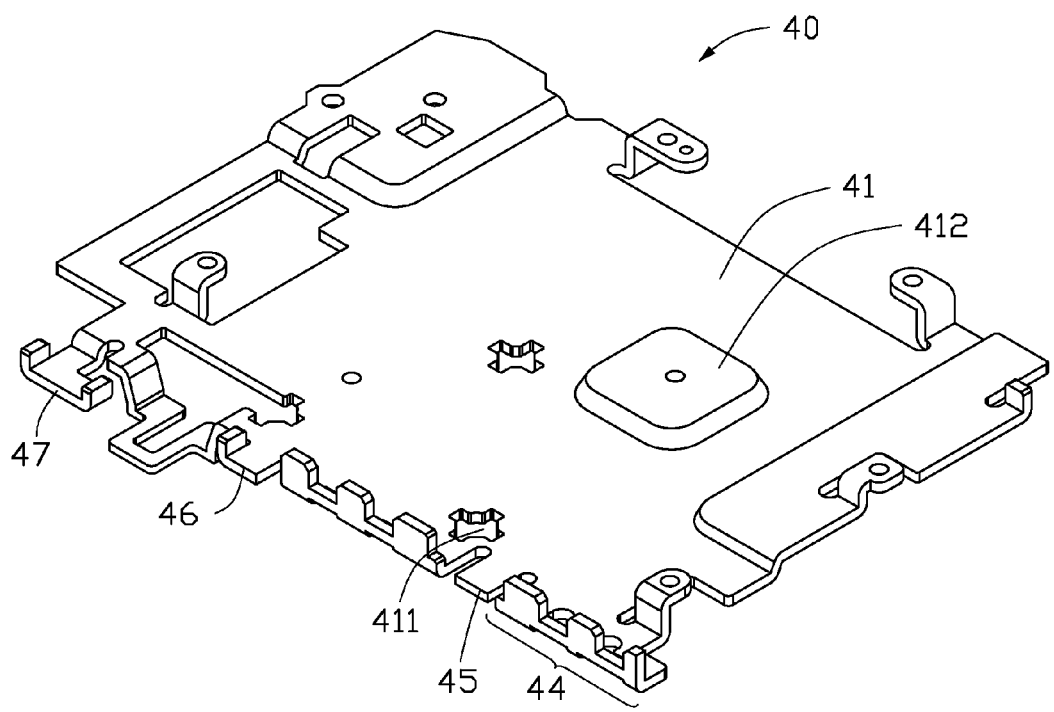
FIG. 5 is an inverted view of the heat dissipating plate of FIG. 4.

Referring to FIGS. 3 to 5, the motherboard 30 includes a substantially rectangular base 31. The base 31 defines a plurality of through holes 311 for fastening the motherboard to the bottom cover 20. A first electronic element 50 is mounted on a center of the base 31, and a second electronic element 60 is mounted adjacent to a lateral side of the base 31. In the present embodiment, the first electronic element 50 is a plate-type central processing unit (CPU), which is the main heat generating component on the motherboard 30.

A plurality of ports are mounted on a lateral side of the base 31 facing the receiving holes 23 of the sidewall 22. In this embodiment, the ports and the second electronic element 60 are arranged at opposite sides of the motherboard 30. The ports include two pairs of earphone ports 34, a USB port 35, a power supply port 36 and a controller port 37. When assembled, the ports 34, 35, 36 and 37 respectively extend through the receiving holes 23 of the bottom cover 20 with ends thereof exposed out for electrically connecting peripheral elements. In other embodiments, other ports can be included such as mini-High-Definition Multimedia Interface, etc., and are not limited by the present embodiment.

Each earphone port 34 includes an elongated rectangular main body 341 and a socket 342 extending out from one end of the main body 341 (FIG. 4). The socket 342 is used for receiving a plug of an earphone. The USB port 35 is mounted between the two pairs of the earphone ports 34, and includes a hollow rectangular sleeve. The sleeve of the USB port 35 defines an opening for enclosing a USB connector. The power supply port 36 is mounted adjacent to one pair of earphone ports 34. The power supply port 36 is used for electrically connecting to an external power supply. The controller port 37 is mounted adjacent to the power supply port 36. The controller port 37 includes a rectangular holder 371 and a connector 372 extending out from the holder 371. The connector 372 of the controller port 37 is electrically connected to an external control device for driving the electronic device 100.

The heat dissipating plate 40 includes a rectangular substrate 41 engaging with the base 31 of the motherboard 30, and a plurality of fasteners extending out from the substrate 41 for engaging with the ports 34, 35, 36 and 37 of the motherboard 31, respectively. The substrate 41 defines a plurality of notches 411 corresponding to the through holes 311 of the base 31 and a bulging cavity 412 at a center of the substrate 41. The bulging cavity 412 has a shape and size substantially equal to that of the first electronic element 50. In this embodiment, the bulging cavity 412 is rectangular. When assembled, a bottom portion of the bulging cavity 412 is pressed firmly against an upper portion of the first electronic element 50.

In the present embodiment, the fasteners of the heat dissipating plate 40 include earphone fasteners 44, a USB fastener 45, a power fastener 46 and a controller fastener 47. These fasteners are corresponding to and engaging with the earphone ports 34, the USB port 35, the power supply port 36, and the controller port 37 of the motherboard 30, respectively.

In the present embodiment, the fasteners include two earphone fasteners 44. Each earphone fastener 44 includes a first block 441, a second block 442, and a third Block 443. The first block 441, the second block 442 and the third block extend downwards from the substrate 41, substantially parallel to and spaced from each other. Two latching notches 444, 445 are respectively defined between the third and second blocks 443, 442, between the second and first blocks 442, 441, for respectively latching the main bodies 341 of one pair of earphone ports 34 therein.

The USB fastener 45 is arranged between the two fasteners 44, and includes a pressing plate 451 extending out from and horizontally to the substrate 41 of the heat dissipating plate 40. A bottom portion of the pressing plate 451 presses firmly against an upper portion of the USB port 35, therefore, the USB port 35 is securely connected to the motherboard 30. In the present embodiment, two opposite side portions of the USB port 35 resist the third block 443 of an adjacent earphone fastener 44 and the first block 441 of another adjacent earphone fastener 44, respectively.

The power fastener 46 is L-shaped. The power fastener 46 includes a planar portion 461 extending out from and horizontally to the substrate 41 and a curved portion 462 extending down from an end of the planar portion 461, which is away from the fasteners 44. A top surface of the power supply port 36 contacts an inner surface of the planar portion 461 of the power fastener 46, and two opposite side surfaces of the power supply port 36 respectively contact the third block 443 of an adjacent earphone fastener 44 and the curved portion 462.

The controller fastener 47 is located adjacent to the power fastener 46. The controller fastener 47 is an inverted U-shaped, and includes a fixing plate 471 extending out from and horizontally to the substrate 41 and two arms 472 and 473 respectively extending down from two opposite ends of the fixing plate 471. The controller fastener 47 engages with the holder 371 of controller port 37 with the fixing plate 471 abutting a top surface of the controller port 37 and the arms 472 and 473 respectively abutting two opposite sides of the controller port 37.

In assembly of the electronic device 100, fasteners (not shown) are inserted into the notches 411 of the substrate 41 and the through holes 311 of the base 31 to fix the heat dissipating plate 40 on the motherboard 30. The bottom portion of the bulging cavity 412 is pressed firmly against the upper portion of the first electronic element 50; and the fasteners 44, 45, 46 and 47 of the heat dissipating plate 40 engage with the ports 34, 35, 36 and 37 of the motherboard 30. Therefore, ports 34, 35, 36 and 37 of the motherboard 30 are kept in position by the fasteners 44, 45, 46 and 47 of the heat dissipating plate 40, and connection of peripheral electronic elements to the motherboard is stable even after a numerous plugging and unplugging of the peripheral electronic elements. Furthermore, the bulging cavity 412 of the heat dissipating plate 40 is securely fixed to the first electronic element 50 of the motherboard 30, and thus heat from the first electronic element 50 can be transferred to the surrounding environment by the heat dissipating plate 40. Therefore, the electronic device 100 has a great heat dissipating capability.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
a motherboard comprising a base, and at least one port and an electronic element mounted on the base of the motherboard; and
a heat dissipating plate comprising a substrate defining a bulging cavity therein, and at least one fastener extending out from the substrate, the at least one fastener engaging with the at least one port of the motherboard for protecting the at least one port from moving, the bulging cavity of the substrate contacting with the electronic element for dissipating heat from the electronic element;
wherein the at least one port comprises a rectangular earphone port, the at least one fastener comprises an earphone fastener engaging with the earphone port, the earphone fastener comprising a first block, a second block extending down from a peripheral edge of the substrate of the heat dissipating plate, and a connecting plate connected between the first block and the second block, the first block, the second block and the connecting plate cooperatively defining a latching notch for latching the earphone port.

2. The electronic device of claim 1, wherein the electronic element is plate-type, a bottom portion of the bulging cavity pressing against an upper portion of the electronic element.

3. The electronic device of claim 1, wherein the at least one port of the motherboard comprises a USB port, the at least one fastener of the heat dissipating plate comprising a USB fastener engaging with the USB port, the USB fastener comprising a pressing plate extending out and horizontally from the substrate of the heat dissipating plate, a bottom portion of the USB fastener pressing against an upper portion of the USB port.

4. The electronic device of claim 3, wherein the at least one port of the motherboard of the electronic device further comprises another earphone port which together with the earphone port forming a pair of earphone ports, and another pair of earphone ports, the USB port being mounted between the two pairs of the earphone ports.

5. The electronic device of claim 4, wherein the at least one fastener further comprises another earphone fastener, the two earphone fasteners respectively engaging with the two pairs of earphone ports, the USB fastener being located between the two earphone fasteners.

6. The electronic device of claim 1, wherein the at least one port of the motherboard comprises a power supply port, the at least one fastener of the heat dissipating plate comprising an L-shaped power fastener engaged with the power supply port.

7. The electronic device of claim 6, wherein the power fastener comprises a planar portion extending out and horizontally from the substrate and a curved portion extending down from an end of the planar portion, the planar portion abutting a top surface of the power supply port, the curved portion abutting a lateral side surface of the power supply port.

8. The electronic device of claim 1, wherein the at least one port of the motherboard comprises a controller port, the at least one fastener of the heat dissipating plate comprising a controller fastener, the controller fastener being inverted U-shaped.

9. The electronic device of claim 8, wherein the controller fastener comprises a fixing plate extending out and horizontally from the substrate and two arms respectively extending down from opposite sides of the fixing plate.

10. The electronic device of claim 1, wherein the substrate of the motherboard defines a through hole, the heat dissipating plate defining a notch, the notch of the heat dissipating plate corresponding to the through hole of the main board.

11. The electronic device of claim 1, further comprising an upper cover and a bottom cover engaging with the upper cover, the bottom cover and the upper cover cooperatively defining a chamber for receiving the motherboard and the heat dissipating plate.

12. The electronic device of claim 1, wherein the bottom cover comprises a bottom wall and a sidewall extending up from a peripheral edge of the bottom wall, the sidewall defining at least one receiving hole for receiving the at least one port of the motherboard.

13. An electronic device, comprising:
an upper cover;
a bottom cover engaged with the upper cover, the bottom cover comprising a bottom wall and a sidewall extending up from peripheral edges of the bottom wall, the sidewall defining a plurality of receiving holes, the bottom cover and the upper cover cooperatively defining a chamber;
a motherboard received in the chamber and comprising a base, a plurality of ports being mounted on the base of the motherboard and ends thereof being exposed out from the receiving hole; and a heat dissipating plate received in the chamber and comprising a substrate and a plurality of fasteners extending out from the substrate for engaging with the ports of the main board;

wherein the motherboard comprises a rectangular earphone port, the heat dissipating plate comprising an earphone fastener engaging with the earphone port, the earphone fastener comprising a first block, a second block extending down from a peripheral edge of substrate of the heat dissipating plate, and a connecting plate connected between the first block and the second block, the first block, the second block and the connecting plate cooperatively defining a latching notch for latching the earphone port.

14. The electronic device of claim 13, further comprising an electronic element being mounted on the base of the motherboard, the substrate defining a bulging cavity, a bottom portion of the bulging cavity contacting an upper portion of the electronic element.

15. The electronic device of claim 13, wherein the motherboard comprises a controller port, the heat dissipating plate comprising a controller fastener, the controller port comprising a cylinder holder, the controller fastener being an inverted U-shaped for engaging with an upper portion of the controller port.

* * * * *